(12) United States Patent
Bengtson

(10) Patent No.: US 9,870,236 B2
(45) Date of Patent: Jan. 16, 2018

(54) CONTROL SYSTEM FOR A WIND TURBINE

(71) Applicant: VESTAS WIND SYSTEMS A/S, Aarhus N (DK)

(72) Inventor: John Bengtson, Aarhus C (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 439 days.

(21) Appl. No.: 14/405,435

(22) PCT Filed: Jun. 4, 2013

(86) PCT No.: PCT/DK2013/050169
§ 371 (c)(1),
(2) Date: Dec. 4, 2014

(87) PCT Pub. No.: WO2013/182197
PCT Pub. Date: Dec. 12, 2013

(65) Prior Publication Data
US 2015/0142191 A1 May 21, 2015

Related U.S. Application Data

(60) Provisional application No. 61/655,484, filed on Jun. 5, 2012.

(30) Foreign Application Priority Data

Jun. 4, 2012 (DK) ................. 2012 70297

(51) Int. Cl.
| | | |
|---|---|---|
| G06F 9/445 | (2006.01) |
| F03D 7/04 | (2006.01) |
| F03D 7/02 | (2006.01) |
| G05B 19/042 | (2006.01) |
| G05B 15/02 | (2006.01) |

(52) U.S. Cl.
CPC ....... *G06F 9/44505* (2013.01); *F03D 7/0264* (2013.01); *F03D 7/042* (2013.01);
(Continued)

(58) Field of Classification Search
CPC .... F03D 7/0204; F03D 7/0224; F03D 7/0264; F03D 7/047; F03D 7/048; F05B 2240/40;
(Continued)

(56) References Cited

U.S. PATENT DOCUMENTS 7,944,070 B2 * 5/2011 Rosenvard ............ F03D 7/0204
290/44
7,962,246 B2 * 6/2011 Middendorf .......... F03D 7/0224
700/2
(Continued)

FOREIGN PATENT DOCUMENTS

DE 102009000913 A1 8/2010
EP 2136273 A2 12/2009
(Continued)

OTHER PUBLICATIONS

International Search Report for PCT/DK2013/050169, dated Oct. 8, 2013.
Danish Search Report for PA 2012 70297, dated Dec. 20, 2012.

*Primary Examiner* — Crystal J Barnes-Bullock
(74) *Attorney, Agent, or Firm* — Patterson + Sheridan, LLP

(57) ABSTRACT

A control system for a wind turbine is provided. The control system includes a plurality of controllers distributed in the wind turbine or the wind power plant; and a plurality of data storage units, each data storage unit being arranged at a respective predetermined position in the wind turbine or the wind power plant and being coupled to the controller arranged at the same position; wherein each data storage unit comprises operational information pertaining to the predetermined position in the wind turbine or the wind power plant; and wherein each controller is configured to read the operational information of the corresponding data storage unit and to determine its function from the operational information.

23 Claims, 5 Drawing Sheets

(52) U.S. Cl.
CPC ............. *F03D 7/047* (2013.01); *F03D 7/048* (2013.01); *G05B 15/02* (2013.01); *G05B 19/0421* (2013.01); *F05B 2240/40* (2013.01); *F05B 2260/845* (2013.01); *F05B 2270/107* (2013.01); *G05B 2219/21028* (2013.01); *G05B 2219/25062* (2013.01); *G05B 2219/2619* (2013.01); *Y02E 10/723* (2013.01)

(58) Field of Classification Search
CPC .......... F05B 2260/845; F05B 2270/107; F05B 2270/1074; Y02E 10/721; Y02E 10/723; G06F 9/44505
See application file for complete search history.

(56) References Cited

U.S. PATENT DOCUMENTS

| | | | | |
|---|---|---|---|---|
| 8,509,956 | B2* | 8/2013 | Jensen | F03D 7/047 700/286 |
| 8,585,363 | B2* | 11/2013 | Jeppesen | F03D 7/0224 416/1 |
| 9,038,058 | B2* | 5/2015 | Molgaard | G06F 9/44505 700/287 |
| 9,106,980 | B2* | 8/2015 | Parakulam | H04Q 9/00 |
| 2005/0090937 | A1 | 4/2005 | Moore et al. | |
| 2010/0138182 | A1 | 6/2010 | Jammu et al. | |
| 2011/0193344 | A1 | 8/2011 | Lafferty et al. | |
| 2015/0115610 | A1* | 4/2015 | Quinlan | F03D 7/0296 290/44 |
| 2015/0370236 | A1* | 12/2015 | Du Plessis | F03D 17/00 700/287 |
| 2015/0377214 | A1* | 12/2015 | Du Plessis | F03D 17/00 700/19 |
| 2015/0381443 | A1* | 12/2015 | Du Plessis | F03D 17/00 709/224 |
| 2017/0078841 | A1* | 3/2017 | Rose, Jr. | H04W 4/021 |

FOREIGN PATENT DOCUMENTS

| | | |
|---|---|---|
| EP | 2141359 A1 | 1/2010 |
| EP | 2177753 A2 | 4/2010 |
| EP | 2410174 A1 | 1/2012 |

* cited by examiner

CONTROL SYSTEM FOR A WIND TURBINE

TECHNICAL FIELD

The present invention relates generally to a control system for a wind turbine.

BACKGROUND

Modern wind turbines and power plant control systems generally have numerous distributed electronic control units (ECUs). The ECUs are usually placed where there is a local need for interface to sensors and actuators, and optionally for control functions and other functions such as data acquisition and communication switches.

The individual ECUs may be programmed and manufactured according to the respective functions in the wind turbines and/or the wind power plant. However, it may not be possible to use these ECUs in different parts of a wind turbine, different types of wind turbines and/or in different wind power plant sub-systems due to the different system configurations.

SUMMARY

According to an embodiment, a control system for a wind turbine or a wind power plant is provided. The control system includes a plurality of controllers distributed in the wind turbine or the wind power plant; and a plurality of data storage units, each data storage unit being arranged at a respective predetermined position in the wind turbine or the wind power plant and being coupled to the controller arranged at the same position; wherein each data storage unit comprises operational information pertaining to the predetermined position in the wind turbine or the wind power plant; and wherein each controller is configured to read the operational information of the corresponding data storage unit and to determine its function from the operational information.

According to an embodiment, each controller may be further configured to determine from the operational information one or more components of the wind turbine or the wind power plant to which it is coupled.

According to an embodiment, the operational information may include one or more from a group consisting of a wind power plant sub-system type, a variant of the wind power plant sub-system, a position in the wind power plant sub-system, a series number of the wind power plant sub-system, a wind turbine type, a variant of the wind turbine, a series number of the wind turbine, a position in the wind turbine, a component type, a variant of the component, a series number of the component, a configuration of the component, a calibration parameter of the component, and information of the control system.

According to an embodiment, the control system may further include at least one main controller coupled to the plurality of controllers. The at least one main controller may be configured to determine if the plurality of controllers have the correct hardware and software configuration based on hardware and software configuration information received from the plurality of controllers and the operational information received from the corresponding data storage units.

According to an embodiment, the at least one main controller may be further configured to transmit software to the plurality of controllers according to the respective functions of the plurality of controllers determined from the operational information of the corresponding data storage units.

According to an embodiment, the at least one main controller may be further configured to prevent start-up of the wind turbine or the wind power plant sub-system and to provide a warning signal when it is determined that at least one of the plurality of controllers has one or both of the wrong hardware configuration and the wrong software configuration, at least one of the plurality of controllers or communication switches is arranged at a wrong position in the wind turbine or the wind power plant or at least one of the plurality of controllers receives the wrong operational information from the corresponding data storage unit.

According to an embodiment, the at least one main controller may be further configured to allow start-up of the wind turbine or the wind power plant sub-system and provide a start-up signal when it is determined that the plurality of controllers have the correct hardware and software configuration, are arranged at the correct positions in the wind turbine or the wind power plant, and receive the correct operational information from the corresponding data storage units.

According to an embodiment, the control system may further include at least one further main controller coupled to the plurality of controllers. The at least one further main controller may be configured to determine if safety-related functions in the plurality of controllers are correct based on the hardware and software configuration information received from the plurality of controllers and the operational information received from the corresponding data storage units.

According to an embodiment, the at least one further main controller may be configured to prevent start-up of the wind turbine or the wind power plant when it is determined that the safety-related functions in the controllers are incorrect.

According to an embodiment, each controller may include at least one controller partition.

According to an embodiment, each data storage unit may include at least one memory partition.

According to an embodiment, the data storage unit includes at least two memory partitions, and each memory partition of the data storage unit may include the same operational information.

According to an embodiment, the controller comprises at least two controller partitions, and each memory partition of the data storage unit may be coupled to a corresponding controller partition of the controller.

According to an embodiment, the number of controller partitions of the controller and the number of memory partitions of the corresponding data storage unit may be the same.

According to an embodiment, the number of controller partitions of the controller and the number of memory partitions of the corresponding data storage unit may be different.

According to an embodiment, the number of controller partitions of the controller may be more than the number of memory partitions of the corresponding data storage unit. One controller partition of the controller may be coupled to a corresponding memory partition of the data storage unit and to the other controller partition of the same controller.

According to an embodiment, the controller partition of the controller may be configured to transmit operational information received from the corresponding memory partition of the data storage unit and to transmit the received operational information to the other controller partition.

According to an embodiment, the number of controller partitions of the controller may be less than the number of memory partitions of the corresponding data storage unit. Two or more memory partitions of the data storage unit may be coupled to a same controller partition of the controller.

According to an embodiment, each data storage unit may include a readable code.

According to an embodiment, the readable code may include a bar-code or a matrix bar-code.

According to an embodiment, each data storage unit may be programmable by the corresponding controller.

According to an embodiment, the at least one main controller and the at least one further main controller may be coupled to the plurality of controllers via a communication network.

According to an embodiment, some of the controllers are communication switches for transmitting information in the communication network.

According to an embodiment, each data storage unit may have safety-related properties in accordance with the requirements of the control system.

According to an embodiment, at least some of the data storage units may be respectively coupled to the at least one main controller and the at least one further main controller.

According to an embodiment, the control system may further include a power plant controller coupled to one or more from a group consisting of one or more of the plurality of controllers, the at least one main controller and the at least one further main controller.

According to an embodiment, the power plant controller may be configured to transmit software to the one or more from a group consisting of one or more of the plurality of controllers, the at least one main controller and the at least one further main controller according to the respective functions of the one or more from a group consisting of one or more of the plurality of controllers, the at least one main controller and the at least one further main controller determined from the operational information of the corresponding data storage units.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of a control system for a wind turbine in accordance with the present invention will be described in detail below with reference to the accompanying figures. It will be appreciated that the exemplary embodiments described below can be modified in various aspects without changing the essence of the invention.

Figure 1:
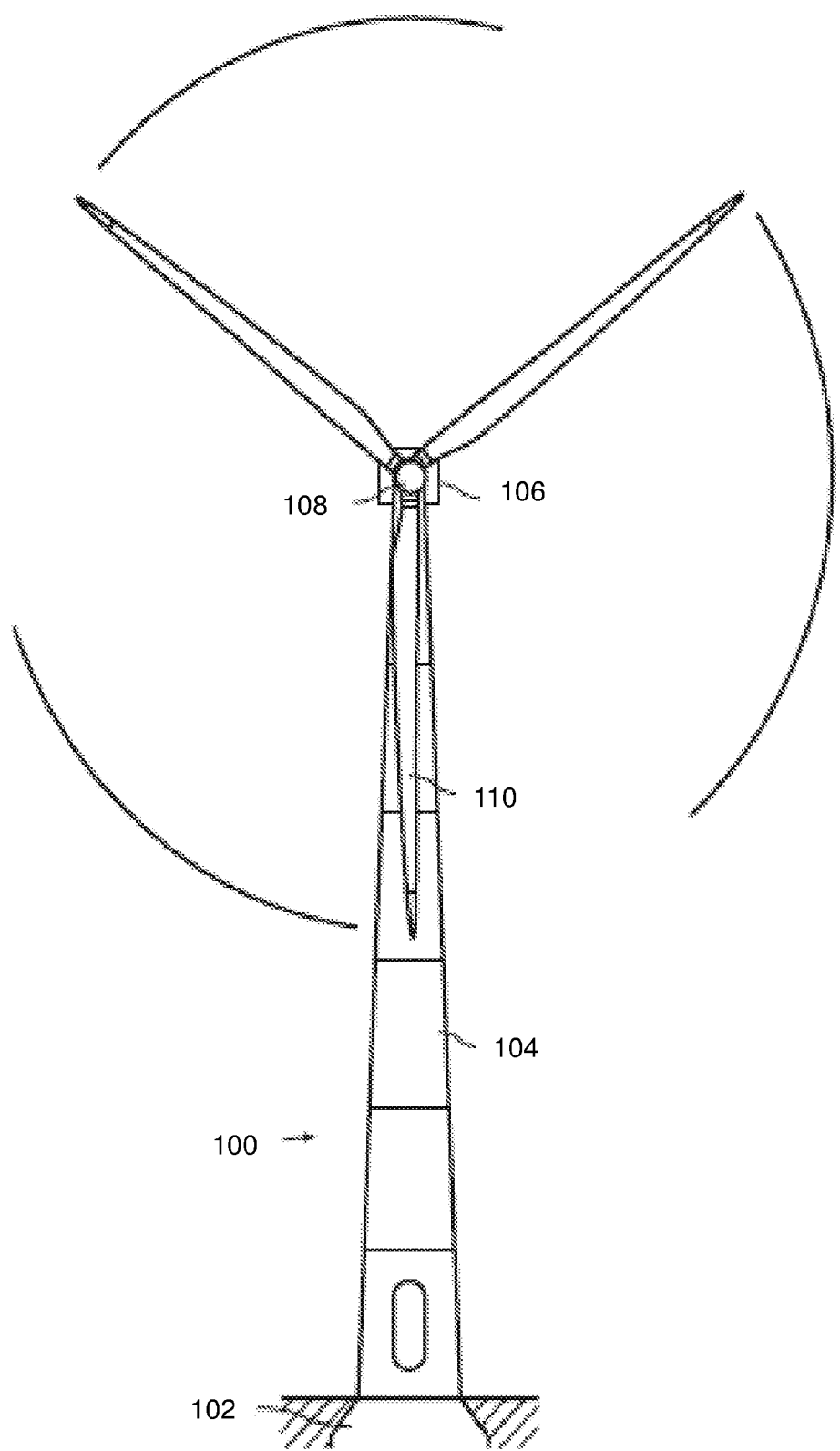
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of tower sections. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106. The low speed shaft typically drives a generator (not shown) for producing electrical power. The electrical power generated is thereafter usually conditioned by a converter system (not shown), comprising a power converter, prior to delivery from the wind turbine to a grid.

The wind turbine 100 has a control system for controlling the various components of the wind turbine 100. The control system may have a plurality of electronic control units (ECUs) which are arranged at the respective components of the wind turbine 100. The individual ECUs may be programmed and manufactured according to the respective functions in the wind turbine 100. However, it may not be possible to use these ECUs in different types of wind turbines and/or in different wind power plant sub-systems due to the different system configurations. As such, the ECUs may have to be programmed and manufactured differently for use in different types of wind turbines and/or in different wind power plant sub-systems. Thus, it is desirable to re-use ECUs in different types of wind turbines and/or in different wind power plant sub-systems.

Figure 2:
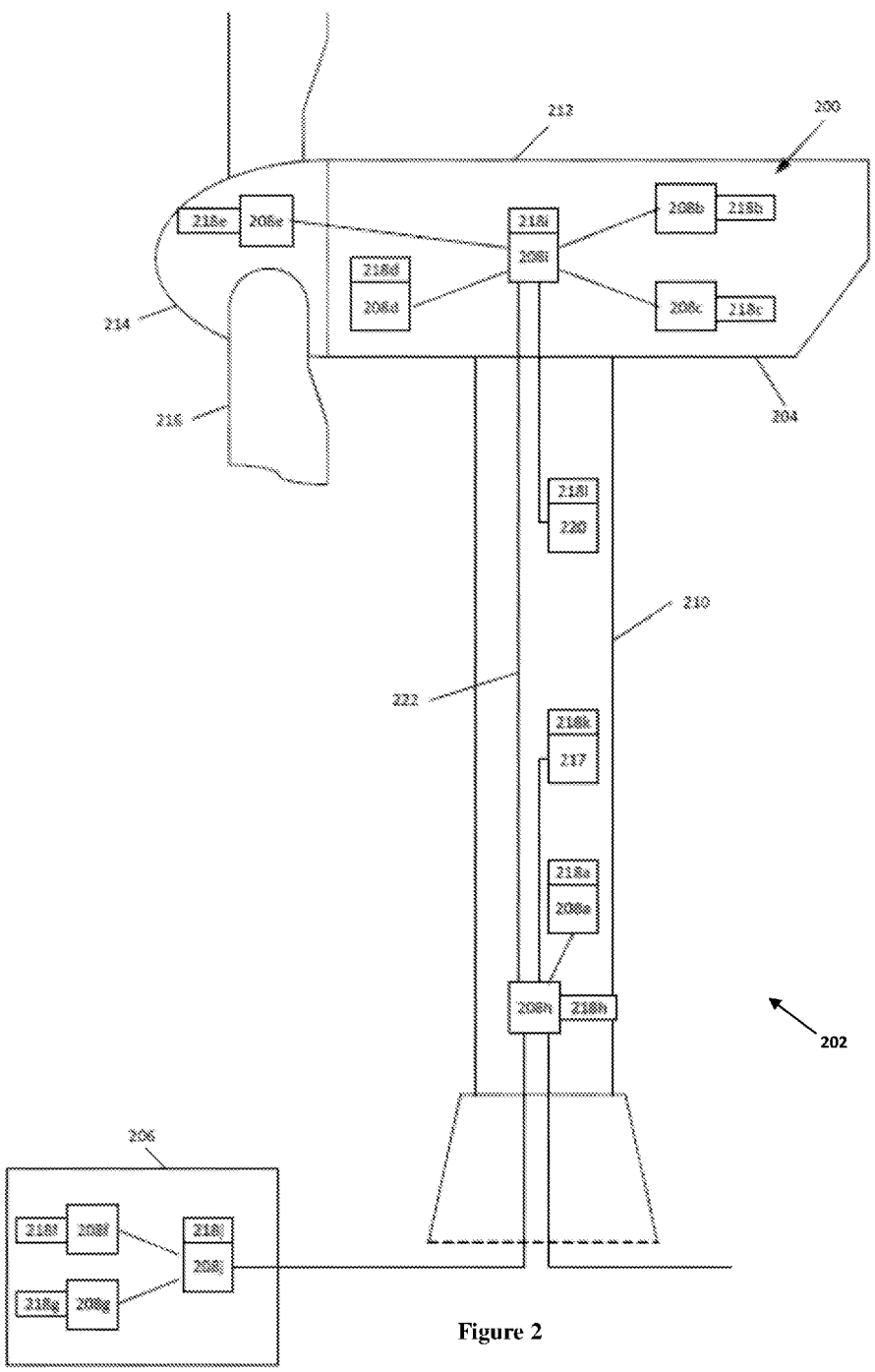
FIG. 2 shows a schematic diagram of a control system of a wind turbine according to an embodiment.

FIG. 2 shows a schematic diagram of a control system 200 according to one embodiment. The control system 200 may be implemented in only the wind turbine or in a whole wind power plant. For illustration purposes, the control system 200 is implemented in a wind power plant 202 having a wind turbine 204 and a sub-station 206. It should be noted that although only one wind turbine 204 is shown in FIG. 2, the wind power plant 202 may comprise more than one wind turbines.

The control system 200 has a plurality of controllers 208a-j (may also be referred as electronic control units (ECUs)). The controllers 208a-j are distributed in the wind power plant 202. For example, the controllers 208a, 208h may be arranged in the tower 210 of the wind turbine 204, the controllers 208b, 208c, 208d, 208i may be arranged in the nacelle 212 of the wind turbine 204, the controller 208e may be arranged in the hub 214 of the wind turbine 204, and the controllers 208f, 208g, 208j may be arranged in the sub-station 206.

In one embodiment, each controller 208a-j may be coupled to one or more components in the wind power plant 202. For example, the controller 208b may be coupled to a generator (not shown), the controller 208c may be coupled to a lubrication station (not shown), and the controller 208d may be coupled to a gearbox (not shown). Further, some controllers (not shown) may also be arranged on the blades 216 of the wind turbine 204. The controllers (not shown) arranged on the blades 216 may be coupled to local sensors such as blade load sensors and lightning sensors. Some controllers (not shown) arranged on the nacelle 212 may be coupled to sensors such as wind speed sensor (anemometer) and wind direction sensor (wind vane). The number of controllers 208*a-j* and the locations and/or arrangements of the controllers 208*a-j* are not limited to that as shown in FIG. 2 and as described above.

The control system 200 further includes a plurality of data storage units 218*a-j*. Each data storage unit 218*a-j* is arranged at a respective predetermined position in the wind power plant 202. For example, each data storage unit 218*a-j* may be physically tied to a specific location in the wind turbine 204 of the wind power plant 202, e.g. gear, generator, cooling station, tower section.

Each data storage unit 218*a-j* is coupled to the controller 208*a-j* arranged at the same position in the wind power plant 202. Each data storage unit 218*a-j* and the corresponding controller 208*a-j* may be communicatively coupled. In one embodiment, each data storage unit 218*a-j* and the corresponding controller 208*a-j* may be communicatively coupled wirelessly.

In another embodiment, each data storage unit 218*a-j* may be detachably connected to the corresponding controller 208*a-j*. Each data storage unit 218*a-j* may be a physical device connected to the corresponding controller 208*a-j* but is not part of the corresponding controller 208*a-j*. Each data storage unit 218*a-j* may have an electrical connector to the corresponding controller 208*a-g*. Each data storage unit 218*a-j* may have any physical form and is not limited to a particular physical implementation. In one embodiment, each data storage unit 218*a-j* may look like what is known as a "dongle" in the computer industry. A "dongle" is a small housing with an integrated connector. In another embodiment, each data storage unit 218*a-j* may look like a sensor with housing and an associated cable with a connector at the other end. In other embodiments, other physical variants of the data storage units 218*a-j* may be developed according to the needs.

Each data storage unit 218*a-j* includes operational information pertaining to the predetermined position in the wind power plant 202. In one embodiment, the operational information may include but is not limited to a wind power plant sub-system type, a variant of the wind power plant sub-system, a position in the wind power plant sub-system, a series number of the wind power plant sub-system, a wind turbine type, a variant of the wind turbine, a series number of the wind turbine, a position in the wind turbine, a component type, a variant of the component, a series number of the component, a configuration of the component, a calibration parameter of the component, and information of the control system. Each data storage unit 218*a-j* may include information about the role/function of the associated controller 208*a-j* in the control system in the wind turbine and/or wind power plant.

In one embodiment, to store the operational information, the data storage units 218*a-j* may be electronically programmed during production by electrical connection. In another embodiment, to store the operational information, the data storage units 218*a-j* may have a RFID programmable persistent memory which is programmable by a RFID programmer and is electronically readable by the controllers 208*a-j*. Further, each data storage units 218*a-j* may be programmable by the corresponding controller 208*a-j*.

In addition to the operational information in the data storage units 218*a-j*, the data storage units 218*a-j* may include a readable code respectively. The readable code may include but is not limited to a bar-code and a matrix bar-code (e.g. QR code). The readable code may be readable by a scanning device. The readable code reflects the data contents (e.g. operational information) of the data storage units 218*a-j*. The readable code can enable automatic and safe programming and identification of the data storage unit 218*a-j* throughout the sourcing chain.

Further, each data storage unit 218*a-j* may have safety-related properties in accordance with the requirements of the control system 200. The data storage units 218*a-j* may have safety-related properties that enable the data storage units 218*a-j* to be used in safety critical systems. The safety-related properties of the data storage units 218*a-j* may include but is not limited to double or triple redundant data storage in separate data areas of the memory, suitable checksums on data values, and suitable hamming distance between codes. The safety-related properties of the data storage units 218*a-j* may be compliant to safety integrity levels 2 or 3 (SIL2 or SIL3) in accordance with the specification for these levels in the IEC61508:2010 standard.

The control system 200 may further include a main controller 217 and a further main controller 220. In one embodiment, the main controller 217 and the further main controller 220 may be a computer respectively.

In one embodiment, the control system 200 may include a data storage unit 218*k* coupled to the main controller 217 and a data storage unit 218*l* coupled to the further main controller 220. The data storage units 218*k*, 218*l* may include information about the respective role/function of the main controller 217 and of the further main controller 220 in the control system 200 in the wind turbine 204 and/or wind power plant 202. The data storage units 218*k*, 218*l* may have the same or similar configurations and properties as the data storage units 218*a-j*.

In one embodiment, the control system 200 may be fault tolerant. The fault tolerant control system 200 may include two or more main controllers (e.g. a first main controller 217*a* and a second main controller 217*b*) (not shown), and two or more further main controllers 220 (e.g. a first further main controller 220*a* and a second further main controller 220*b*) (not shown). The first main controller 217*a* may be redundant by the second main controller 217*b*. The first further main controller 220*a* may be redundant by the second further main controller 220*b*. In the event that one of the main controllers 217 (e.g. the first main controller 217*a*) fails, the other main controller (e.g. the second main controller 217*b*) may be used to carry out the functions for the wind turbine 204 and/or the wind power plant 202 to operate. In the event that one of the further main controllers 220 (e.g. the first further main controller 220*a*) fails, the other further main controller (e.g. the second further main controller 220*b*) may be used to carry out the functions for the wind turbine 204 and/or the wind power plant 202 to operate.

In one embodiment, the control system 200 may include data storage units (not shown) respectively coupled to the first main controller 217*a*, the second main controller 217*b*, the first further main controller 220*a* and the second further main controller 220*b*.

For simplicity of illustration, only one main controller 217 and only one further main controller 220 are shown in FIG. 2 and are described herein.

In one embodiment, the main controller 217 and the further main controller 220 may be separate elements. In another embodiment, the main controller 217 and the further main controller 220 may be a single element. That is, the further main controller 220 may be incorporated into the main controller 217.

The main controller 217 and the further main controller 220 are coupled to the plurality of controllers 208*a-j*. The main controller 217 and the further main controller 220 are coupled to the plurality of controllers 208*a-j* via a communication network 222. In one embodiment, the communication network 222 may include Ethernet or time-triggered communication network. Alternatively, other suitable types of network may also be used for the communication network 222.

In one embodiment, the communication network 222 may be implemented for one wind turbine only. In another embodiment, the communication network 222 may extend outside the wind turbine and may be connected to other wind turbines or sub-stations. For illustration purposes, FIG. 2 shows that the communication network 222 is implemented for the wind power plant 202 having the wind turbine 204 and the sub-station 206.

In one embodiment, the controllers 208h, 208i, 208j are communication switches for transmitting information/data in the communication network 222. The communication switches 208h, 208i, 208j may be coupled to the other controllers 208a-g, the main controller 217, and the further main controller 220. The communication switches 208h, 208i, 208j may transmit information/data between the main controller 217 and the other controllers 208a-g, between the further main controller 220 and the other controllers 208a-g, and between the main controller 217 and the further main controller 220. As shown in FIG. 2, the communication switch 208h is arranged in the tower 210, the communication switch 208i is arranged in the nacelle 212, and the communication switch 208j is arranged in the sub-station 206. The communication switch 208h in the tower 210 may be directly coupled to the communication switch 208i in the nacelle 212. Communication switches may also be arranged in the hub 214. The number of communication switches and the locations and/or arrangements of the communication switches are not limited to that as shown in FIG. 2 and as described above.

Before the starting up of the wind power plant 202 and/or wind turbine 204, the controllers 208a-j read the operational information of the corresponding data storage units 218a-j. In one embodiment, the controllers 208a-j may read the operational information of the corresponding data storage units 218a-j at any time after the controllers 208a-j are switched on. In another embodiment, the controllers 208a-j may read the operational information of the corresponding data storage units 218a-j upon power-up of the controllers 208a-j. The controllers 208a-j determine the respective functions from the operational information. The controllers 208h, 208i, 208j may determine their functions as communication switches for transmitting data between communication ports from the operational information of the corresponding data storage units 218h, 218i, 218j. The controllers 208a-j may also determine from the operational information the one or more components of the wind power plant 202 and/or wind turbine 204 to which they are coupled.

The main controller 217 transmits software to the plurality of controllers 208a-j according to the respective functions of the plurality of controllers 208a-j determined from the operational information of the corresponding data storage units 218a-j.

Further, the main controller 217 determines if the plurality of controllers 208a-j have the correct hardware and software configuration based on hardware and software configuration information received from the plurality of controllers 208a-j and the operational information received from the corresponding data storage units 218a-j.

"Hardware configuration" of a controller refers to how the controller hardware is composed, e.g. microprocessor type, memory size, I/O types and numbers and communication interfaces. A controller usually has type, variant, and revision numbers from which the hardware configuration can be derived. Alternatively, the information can be provided in a form of configuration tables or other suitable forms. A controller can provide these numbers to an outside controller, such as a main controller (e.g. main controller 217), for a system configuration check. The purpose of the hardware configuration check is to ensure that the correct controller is used for the application.

"Software configuration" of a controller refers to information of software which the controller has. A controller can provide the software configuration information to an outside controller, such as a main controller (e.g. main controller 217), for a system configuration check. The purpose of the software configuration check is to ensure that the software in the controller is the correct software for the application and that it is the most recent approved version.

Both the hardware and software configuration check can be very important in relation to securing the integrity of the control system (e.g. control system 200). Integrity check can be an essential in relation to safety-related systems.

If it is determined that at least one of the plurality of controllers 208a-j has one or both of the wrong hardware configuration and the wrong software configuration, at least one of the plurality of controllers 208a-j is arranged at a wrong position in the wind turbine 204 or the wind power plant 202 or at least one of the plurality of controllers 208a-j receives the wrong operational information from the corresponding data storage unit 218a-j, the main controller 206 prevents start-up of the wind turbine 204 or the wind power plant sub-system and transmits a warning signal.

The wind power plant 202 may have various sub-systems (not shown). In one embodiment, the wind power plant sub-system may be a measurement system for measurement of voltage, current and phase angle at the point of common coupling. In another embodiment, the wind power plant sub-system may be a battery system that provides back-up power in case of grid failure. In another embodiment, the wind power plant sub-system may be a metrology system for measuring wind speed and wind direction. In another embodiment, the wind power plant sub-system may be a switch-gear controller system.

In the event that a wrong configuration occurs in a particular wind power plant sub-system, the wind power plant 202 may still be allowed to operate. The wind power plant 202 may operate normally if the wind power plant sub-system having the wrong configuration is not mandatory for the wind power plant 202 to operate.

If it is determined that the plurality of controllers 208a-j have the correct hardware and software configuration, are arranged at the correct positions in the wind turbine 204 or the wind power plant 202, and receive the correct operational information from the corresponding data storage units 218a-j, the main controller 206 transmits a wind turbine start-up signal.

In other words, the data contents (e.g. operational information) of the data storage units 218a-j can be used to safely verify the system configuration before starting the wind turbine 204 or the wind power plant 202. The data contents (e.g. operational information) of the data storage units 218a-j can be used to safely verify that the software configuration of the distributed control system nodes is compliant to the system configuration before starting the wind turbine 204 or the wind power plant 202.

In one embodiment, the control system 200 may include a power plant controller (not shown) in the sub-station 206. The power plant controller may be coupled to the controllers 208f, 208g, 208j in the sub-station 206. The power plant controller may have the same or similar functions as the main controller 217. For example, the power plant controller may transmit software to the controllers 208f, 208g, 208j in the sub-station 206 according to the respective functions of the controllers 208f, 208g, 208j determined from the operational information of the corresponding data storage units 218f, 218g, 218j.

In another embodiment, the power plant controller may be coupled to the plurality of controllers 208a-j. The power plant controller may transmit software to the plurality of controllers 208a-j according to the respective functions of the plurality of controllers 208a-j determined from the operational information of the corresponding data storage units 218a-j. The power plant controller may also be coupled to the main controller 217 and/or the further main controller 220. The power plant controller may also transmit software to the main controller 217 and/or the further main controller 220 according to the respective functions determined from the operational information of the corresponding data storage units 218k, 218l.

Various configurations can be used for the control system 200. For simplicity of illustration, only one main controller 217 is described herein.

Before the starting up of the wind power plant 202 and/or wind turbine 204, the further main controller 220 determines if safety-related functions in the plurality of controllers 208a-j are correct based on the hardware and software configuration information received from the plurality of controllers 208a-j and the operational information received from the corresponding data storage units 218a-j. If it is determined that the safety-related functions in the controllers 208a-j are incorrect, the further main controller 220 prevents start-up of the wind turbine 204 or the wind power plant 202. The safety-related control functions of the controllers 208a-j can include but are not limited to functions that protect personnel working in the turbine such as emergency stops, interlocks and light curtains, and functions that protect the turbine such as load monitoring, over-speed detection, arc detection, smoke detection, yaw position monitoring and blade pitch control. The further main controller 220 is a safety-related protection controller because the further main controller 220 performs a check to ensure that the safety-related functions in the controllers 208a-j are correct before the wind power plant 202 and/or wind turbine 204 are allowed to start up.

Therefore, it can be understood by a skilled person from the above description that the control system 200 also performs as a protection system which performs safety-related control functions. Some of the safety-related control functions can include protecting humans working in the wind turbine, and protecting the integrity of the wind turbine to avoid failures in the control system leading to structural damage on the wind turbine, sub-systems of the wind turbine or the sub-station system.

The above described control system 200 can allow re-use of the controllers 208a-j for different wind turbines and different sub-systems in the wind turbines. The above described control system 200 can allow the controllers 208a-j to automatically and safely determine their positions and functions in the wind turbine 204 or in the wind power plant 202 while ensuring that the controllers 208a-j have the correct hardware and software configuration, are arranged at the correct positions in the wind turbine 204 or the wind power plant 202, and receive the correct operational information from the corresponding data storage units 218a-j. The above described control system 200 can also allow the controllers 208a-j to receive the appropriate software (e.g. the latest version of software) for operating in the wind turbine 204 or the wind power plant 202 according to the respective functions and the respective positions at which they are arranged.

Such determination of position, function and configuration can improve manufacturing, operation and maintenance of the wind turbine 204 or the wind power plant 202 as the risk associated with human errors can be reduced. In case of erroneous mounting of the controllers 208a-j, the control system 200 can automatically detect it and prevent automatic start-up of the wind turbine 204 or the wind power plant 202. The operator can be properly warned and corrective action can be taken. As such, the wind turbine/wind power plant system reliability and safety can be improved.

In order to allow re-use of the controllers 208a-j, the data storage units 218a-j remain at the respective predetermined positions of the wind turbine 204 even when the controllers 208a-j are replaced. Therefore, each data storage unit 218a-j is coupled to the one or more predetermined components of the wind turbine 204 or of the wind power plant 202. The one or more predetermined components may form or belong to a sub-system of the wind power plant 202 or of the wind turbine 204. Thus, each data storage unit 218a-j may be considered as part of the sub-system of the wind power plant 202 or of the wind turbine 204. As such, besides determining the positions and functions of the controllers 208a-j in the wind turbine 204 or the wind power plant 202, the operational information of the data storage units 218a-j can also allow the controllers 208a-j to verify in which sub-systems the controllers 208a-j are mounted.

Figure 3:
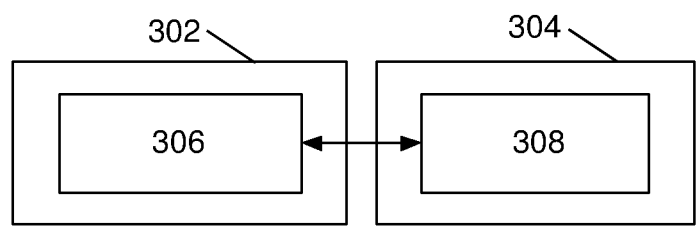
FIG. 3 shows a schematic diagram of a controller of a control system coupled to a data storage unit of the control system according to an embodiment.

FIG. 3 shows an exemplary controller 302 coupled to an exemplary data storage unit 304 according to one embodiment. The controller 302 has at least one controller partition 306 and the data storage unit 304 has at least one memory partition 308. In one embodiment, the number of controller partitions 306 of the controller 302 and the number of memory partitions 308 of the data storage unit 304 are the same. The controller 302 has one controller partition 306 and the data storage unit 304 has one memory partition 308.

The memory partition 308 of the data storage unit 304 is coupled to the controller partition 306 of the controller 302. The memory partition 308 of the data storage unit 304 has the operational information pertaining to the predetermined component of the wind turbine 200 at which the data storage unit 304 is arranged. The memory partition 308 may be persistent memory that can be read and modified by the controller 302 (e.g. controller partition 306 of the controller 302). The controller partition 306 of the controller 302 may provide power to the memory partition 308 of the data storage unit 304, and the memory partition 308 of the data storage unit 304 may provide the operational information to the controller partition 306 of the controller 302.

Figure 4:
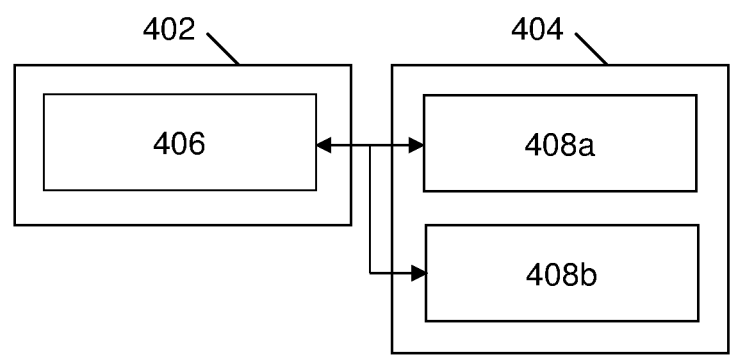
FIG. 4 shows a schematic diagram of a controller of a control system coupled to a data storage unit of the control system according to an embodiment.

FIG. 4 shows an exemplary controller 402 coupled to an exemplary data storage unit 404 according to one embodiment. The controller 402 has one controller partition 406 and the data storage unit 404 has more than one memory partitions (e.g. two memory partitions 408a, 408b). The number of controller partitions 406 of the controller 402 and the number of memory partitions 408a, 408b of the data storage unit 404 are different. The controller partition 406 of the controller 402 is coupled to both the memory partitions 408a, 408b of the data storage unit 404. The two memory partitions 408a, 408b of the data storage unit 404 have the same operational information pertaining to the predetermined component of the wind turbine at which the data storage unit 404 is arranged. The memory partitions 408a, 408b may be persistent memory that can be read and modified by the controller partition 404. The controller partition 406 of the controller 402 may provide power to both the memory partitions 408a, 408b of the data storage unit 404, and one or both of the memory partitions 408a, 408b of the data storage unit 404 may provide the operational information to the controller partition 406 of the controller 402.

In one embodiment, the data storage unit 404 is fault tolerant as it has more than one memory partitions 408a, 408b which have the same operational information. In an event that one of the memory partitions (e.g. memory partition 408a) fails or the coupling between the controller partition 406 and one of the memory partitions (e.g. memory partition 408a) fails, the controller partition 406 may still be able to obtain operational information from the other memory partition (e.g. memory partition 408b). Thus, by having more than one memory partitions 408a, 408b can reduce the probability that a random failure in a memory partition 408a, 408b or a related interface with the controller 402 and/or controller partition 406 can cause a situation where the wind turbine cannot start up due to lack of operational information (e.g. system configuration information).

Figure 5:
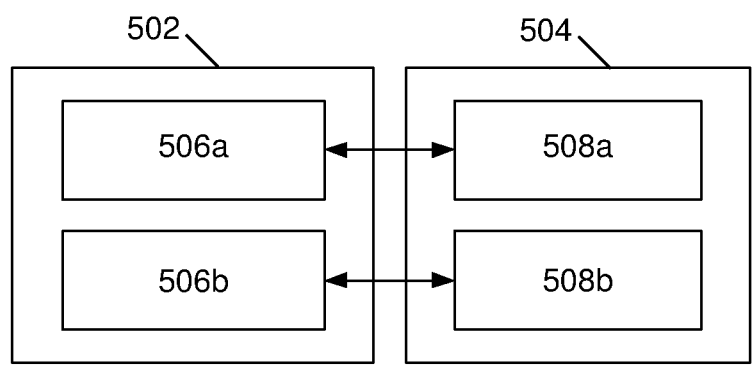
FIG. 5 shows a schematic diagram of a controller of a control system coupled to a data storage unit of the control system according to an embodiment.

FIG. 5 shows an exemplary controller 502 coupled to an exemplary data storage unit 504 according to one embodiment. The controller 502 has more than one controller partitions (e.g. two controller partitions 506a, 506b) and the data storage unit 504 has more than one memory partitions (e.g. two memory partitions 508a, 508b). The number of controller partitions 506a, 506b of the controller 502 and the number of memory partitions 508a, 508b of the data storage unit 504 are the same. Each memory partition 508a, 508b of the data storage unit 504 is coupled to a corresponding controller partition 506a, 506b of the controller 502. The two memory partitions 508a, 508b of the data storage unit 504 have the same operational information pertaining to the predetermined component of the wind turbine 200 at which the data storage unit 504 is arranged. The memory partitions 508a, 508b may be persistent memory that can be read and modified by the corresponding controller partition 506a, 506b. The controller partitions 506a, 506b of the controller 502 may provide power to the corresponding memory partitions 508a, 508b of the data storage unit 504, and the memory partitions 508a, 508b of the data storage unit 504 may provide the operational information to the corresponding controller partitions 506a, 506b of the controller.

In one embodiment, the controller 502 is fault tolerant as it has more than one controller partitions 506a, 506b. If one of the controller partitions (e.g. controller partition 506a) fails, the other controller partition (e.g. controller partition 506b) can still receive operational information from the corresponding memory partition (e.g. memory partition 508b). Similarly, as described above, the data storage unit 504 is fault tolerant as it has more than one memory partitions 508a, 508b.

Figure 6:
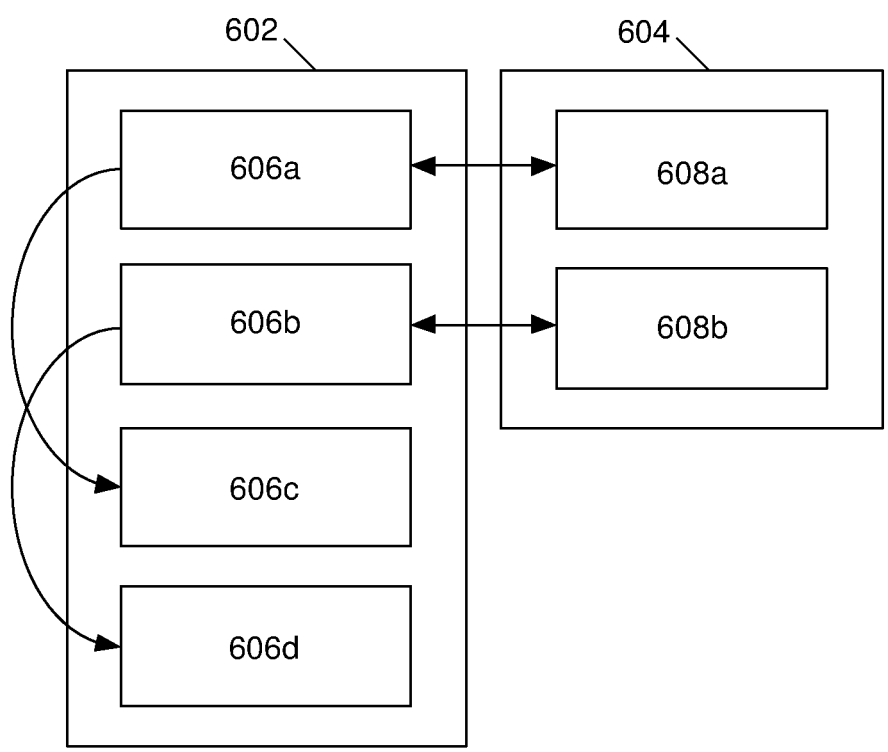
FIG. 6 shows a schematic diagram of a controller of a control system coupled to a data storage unit of the control system according to an embodiment.

FIG. 6 shows an exemplary controller 602 coupled to an exemplary data storage unit 604 according to one embodiment. The controller 602 has more than one controller partitions (e.g. four controller partitions 606a, 606b, 606c, 606d), and the data storage unit 604 has more than one memory partitions (e.g. two memory partitions 608a, 608b). The number of controller partitions 606a, 606b, 606c, 606d of the controller 602 and the number of memory partitions 608a, 608b of the data storage unit 604 are different. The number of controller partitions 606a, 606b, 606c, 606d of the controller 602 is more than the number of memory partitions 608a, 608b of the data storage unit 604. The two memory partitions 608a, 608b of the data storage unit 604 have the same operational information pertaining to the predetermined component of the wind turbine 200 at which the data storage unit 604 is arranged.

As shown in FIG. 6, the one controller partition 606a of the controller 602 is coupled to a corresponding memory partition 608a of the data storage unit 604 and is coupled to the other controller partition 606c of the same controller 602. The controller partition 606b of the controller 602 is coupled to a corresponding memory partition 608b of the data storage unit 604 and is coupled to the other controller partition 606d of the same controller 602. The controller partitions 606a, 606b of the controller 602 may provide power to the corresponding memory partitions 608a, 608b of the data storage unit 604, and the memory partitions 608a, 608b of the data storage unit 604 may provide the operational information to the corresponding controller partitions 606a, 606b of the controller 602. In one embodiment, the memory partitions 608a, 608b may be persistent memory that can be read and modified by the corresponding controller partition 606a, 606b. The controller partitions 606a, 606b may provide the operational information to the respective coupled controller partitions 606c, 606d.

In one embodiment, as described above, the controller 602 is fault tolerant as it has more than one controller partitions 606a, 606b, 606c, 606d. Similarly, as described above, the data storage unit 604 is fault tolerant as it has more than one memory partitions 608a, 608b.

The configurations of the controller and the data storage unit are not limited to the embodiments as described above and as shown in FIGS. 3 to 6. Different configurations can be used for the controller and the data storage unit.

In one embodiment, the controllers used in a wind turbine may have the same configuration. In another embodiment, the controllers used in a wind turbine may have different configurations.

In one embodiment, the data storage units used in a wind turbine may have the same configuration. In another embodiment, the data storage units used in a wind turbine may have different configurations.

Further, the controller may have safety-related control functions and may be considered as safety controller. As such, the controller may have safety-related properties. Therefore, the controller may include safety and/or non-safety controller partitions.

In one embodiment, all the controller partitions of the controller may be safety controller partitions or non-safety partitions.

In another embodiment, some of the controller partitions of the controller may be safety controller partitions and the remaining controller partitions of the controller may be non-safety controller partitions. For example, referring to FIG. 6, the controller partitions 606a, 606b of the controller 602 may be safety controller partitions and the controller partitions 606c, 606d of the controller 602 may be non-safety controller partitions.

The safety controller partitions of the controller may perform control functions relating to the safety of equipment or personnel, for example a shutdown of the wind turbine if it detected that a converter is faulty or a personnel is inside the turbine. The non-safety controller partitions of the controller may perform control functions during normal operation.

As such, the safety-related properties of the controller and of the memory partition can allow them to be used in safety critical systems such as wind turbine systems and wind power plant systems.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A control system for a wind turbine or a wind power plant, the control system comprising:
   a plurality of controllers distributed in the wind turbine or the wind power plant;
   a plurality of data storage units, each data storage unit being arranged at a respective predetermined position in the wind turbine or the wind power plant and being coupled to a corresponding one of the plurality of controllers arranged at the same position;
   wherein each data storage unit comprises operational information pertaining to the predetermined position in the wind turbine or the wind power plant, and
   wherein each controller is configured to read the operational information of the corresponding data storage unit and to determine its function from the operational information; and
   a first main controller coupled to the plurality of controllers, wherein the first main controller is configured to determine if the plurality of controllers have a correct hardware and software configuration based on hardware and software configuration information received from the plurality of controllers and the operational information received from the corresponding data storage units, wherein the first main controller is further configured to prevent start-up of the wind turbine or a wind power plant sub-system and to provide a warning signal when it is determined that at least one of the plurality of controllers has one or both of a wrong hardware configuration and a wrong software configuration,
   wherein at least one of the plurality of controllers is arranged at a wrong position in the wind turbine or the wind power plant or at least one of the plurality of controllers receives the wrong operational information from the corresponding data storage unit.

2. The control system of claim 1,
   wherein each controller is further configured to determine from the operational information one or more components of the wind turbine or the wind power plant to which it is coupled.

3. The control system of claim 1,
   wherein the operational information comprises one or more from a group consisting of a wind power plant sub-system type, a variant of the wind power plant sub-system, a position in the wind power plant sub-system, a series number of the wind power plant sub-system, a wind turbine type, a variant of the wind turbine, a series number of the wind turbine, a position in the wind turbine, a component type, a variant of the component, a series number of the component, a configuration of the component, a calibration parameter of the component, and information of the control system.

4. The control system of claim 1,
   wherein the first main controller is configured to transmit software to the plurality of controllers according to the respective functions of the plurality of controllers determined from the operational information of the corresponding data storage units.

5. The control system of claim 1,
   wherein each controller comprises at least one controller partition.

6. The control system of claim 1,
   wherein each data storage unit comprises at least one memory partition.

7. The control system of claim 6,
   wherein the data storage unit comprises at least two memory partitions, and
   wherein each memory partition of the data storage unit comprises the same operational information.

8. The control system of claim 1,
   wherein each data storage unit comprises a readable code.

9. The control system of claim 1,
   wherein each data storage unit is programmable by the corresponding controller.

10. The control system of claim 1,
    wherein each data storage unit comprises safety-related properties in accordance with requirements of the control system.

11. A control system for a wind turbine or a wind power plant, the control system comprising:
    a plurality of controllers distributed in the wind turbine or the wind power plant;
    a plurality of data storage units, each data storage unit being arranged at a respective predetermined position in the wind turbine or the wind power plant and being coupled to a corresponding one of the plurality of controllers arranged at the same position;
    wherein each data storage unit comprises operational information pertaining to the respective predetermined position in the wind turbine or the wind power plant, and
    wherein each controller is configured to read the operational information of the corresponding data storage unit and to determine its function from the operational information; and
    a first main controller coupled to the plurality of controllers, wherein the first main controller is configured to determine if the plurality of controllers have a correct hardware and software configuration based on hardware and software configuration information received from the plurality of controllers and the operational information received from the corresponding data storage units, wherein the first main controller is further configured to allow start-up of the wind turbine or a wind power plant sub-system and provide a start-up signal when determining that the plurality of controllers have the correct hardware and software configuration, are arranged at correct positions in the wind turbine or the wind power plant, and receive correct operational information from the corresponding data storage units.

12. A control system for a wind turbine or a wind power plant, the control system comprising:
    a plurality of controllers distributed in the wind turbine or the wind power plant;
    a plurality of data storage units, each data storage unit being arranged at a respective predetermined position in the wind turbine or the wind power plant and being coupled to a corresponding one of the plurality of controllers arranged at the same position;
    wherein each data storage unit comprises operational information pertaining to the respective predetermined position in the wind turbine or the wind power plant, and wherein each controller is configured to read the operational information of the corresponding data storage unit and to determine its function from the operational information;
a first main controller coupled to the plurality of controllers, wherein the first main controller is configured to determine if the plurality of controllers have a correct hardware and software configuration based on hardware and software configuration information received from the plurality of controllers and the operational information received from the corresponding data storage units, and
a second main controller coupled to the plurality of controllers;
wherein the second main controller is configured to determine if safety-related functions in the plurality of controllers are correct based on the hardware and software configuration information received from the plurality of controllers and the operational information received from the corresponding data storage units.

13. The control system of claim 12,
wherein the second main controller is configured to prevent start-up of the wind turbine or the wind power plant when determining that the safety-related functions in the controllers are incorrect.

14. The control system of claim 12,
wherein the first main controller and the second main controller are coupled to the plurality of controllers via a communication network.

15. The control system of claim 14,
wherein some of the controllers are communication switches for transmitting information in the communication network.

16. The control system of claim 12,
wherein at least some of the data storage units data storage units are respectively coupled to the first main controller and the second main controller.

17. The control system of claim 16,
further comprising a power plant controller coupled to one or more from a group consisting of one or more of the plurality of controllers, the first main controller and the second main controller.

18. The control system of claim 17,
wherein the power plant controller is configured to transmit software to the one or more from a group consisting of one or more of the plurality of controllers, the first main controller and the second main controller according to the respective functions of the one or more from a group consisting of one or more of the plurality of controllers, the first main controller and the second main controller determined from the operational information of the corresponding data storage units.

19. A control system for a wind turbine or a wind power plant, the control system comprising:
a plurality of controllers distributed in the wind turbine or the wind power plant, wherein each of the plurality of controllers comprises at least two controller partitions; and
a plurality of data storage units, each data storage unit being arranged at a respective predetermined position in the wind turbine or the wind power plant and being coupled to a corresponding one of the plurality of controllers arranged at the same position, wherein each data storage unit comprises at least one memory partition, and wherein each memory partition of the data storage unit is coupled to a corresponding controller partition of the controller;
wherein each data storage unit comprises operational information pertaining to the respective predetermined position in the wind turbine or the wind power plant,
wherein each controller is configured to read the operational information of the corresponding data storage unit and to determine its function from the operational information.

20. The control system of claim 19,
wherein a number of controller partitions of each of the plurality of controllers is more than a number of memory partitions of the corresponding data storage unit;
wherein one controller partition of each of the plurality of controllers is coupled to a corresponding memory partition of the data storage unit and to the other controller partition of the same controller.

21. The control system of claim 20,
wherein the controller partition of each of the plurality of controllers is configured to transmit operational information received from the corresponding memory partition of the data storage unit and to transmit the received operational information to the other controller partition.

22. The control system of claim 19,
wherein a number of controller partitions of each of the plurality of controllers is less than a number of memory partitions of the corresponding data storage unit;
wherein two or more memory partitions of the data storage unit are coupled to a same controller partition of the controller.

23. A control system for a wind turbine or a wind power plant, the control system comprising:
a plurality of controllers distributed in the wind turbine or the wind power plant; and
a plurality of data storage units, each data storage unit being arranged at a respective predetermined position in the wind turbine or the wind power plant and being coupled to a corresponding one of the plurality of controllers arranged at the same position,
wherein each data storage unit comprises operational information pertaining to the respective predetermined position in the wind turbine or the wind power plant, wherein each data storage unit comprises a readable code, wherein the readable code comprises a bar-code or a matrix bar-code, and
wherein each controller is configured to read the operational information of the corresponding data storage unit and to determine its function from the operational information.

* * * * *